United States Patent [19]

Cowgill

[11] 4,323,160
[45] Apr. 6, 1982

[54] USE OF A VIBRATING SCREEN TO SEPARATE SMALL LIVE INSECTS FROM AGRICULTURAL COMMODITIES

[75] Inventor: Ronald H. Cowgill, Cincinnati, Ohio

[73] Assignee: The Procter & Gamble Company, Cincinnati, Ohio

[21] Appl. No.: 145,285

[22] Filed: Apr. 30, 1980

[51] Int. Cl.$^3$ ................................................ B07C 5/04
[52] U.S. Cl. ................................... 209/632; 209/634; 209/235; 209/674; 209/682
[58] Field of Search .................... 209/682, 674, 44.1, 209/235, 236, 274, 275, 314, 606, 632, 634

[56] References Cited

U.S. PATENT DOCUMENTS

| 409,180 | 8/1889 | Ferguson et al. | |
|---|---|---|---|
| 545,185 | 8/1895 | Yost . | |
| 799,468 | 9/1905 | Jungers | 209/674 X |
| 2,710,712 | 6/1955 | Friedman | 209/682 X |
| 3,073,284 | 1/1963 | Roberts . | |
| 3,093,761 | 6/1963 | Case . | |
| 3,385,431 | 5/1968 | Pletcher | 209/235 X |

FOREIGN PATENT DOCUMENTS 1441632 4/1965 France .............................. 209/682

*Primary Examiner*—Allen N. Knowles
*Attorney, Agent, or Firm*—Eric W. Guttag; Rose Ann Dabek; Richard C. Witte

[57] ABSTRACT

Small live insects are separated from green coffee beans or similar sized agricultural commodities by vibrating a screen on which the beans are placed at a frequency of at least 60 cycles per second. The insects are inactivated by the vibrations and fall through a multiplicity of apertures in the screen sized smaller than the beans but larger than the insects. The vibrating screen is usually capable of removing substantially all of the small live insects from the beans. The insects separated from the beans can then be suitable disposed of.

10 Claims, 2 Drawing Figures

USE OF A VIBRATING SCREEN TO SEPARATE SMALL LIVE INSECTS FROM AGRICULTURAL COMMODITIES

TECHNICAL FIELD

The present application relates to a method for separating small live insects from agricultural commodities, in particular, green coffee beans.

BACKGROUND ART

As in the case of many other agricultural commodities, green coffee beans are subject to the inherent problem of insect contamination. Upon receipt of a bag of green coffee beans, it has usually been found that a certain number of small live insects are contained therein. Generally, the contamination ranges from about 1 to 15 insects per bag of green coffee beans. Such insect contamination is usually in excess of FDA guidelines for green coffee bean imports. Therefore, removal of the live insects from the green coffee beans in extremely important.

A prior art method for removing the insects is to fumigate the green coffee beans with methyl bromide. Fumigation with methyl bromide presents two problems. First, fumigation with methyl bromide involves contact between beverage materials and chemicals, which is normally avoided where possible. Second, the cost of methyl bromide fumigation is extremely high. Therefore, an alternative to fumigation with methyl bromide is extremely desirable.

It is therefore an object of the present invention to provide a method for separating small live insects from green coffee beans or similar sized agricultural commodities without the use of chemical additives, in particular, methyl bromide.

It is a further object of the present invention to provide a method for separating small live insects from green coffee beans or similar sized agricultural commodities which is efficient and yet relatively inexpensive.

These and other objects of the present invention are disclosed hereinafter.

DISCLOSURE OF THE INVENTION

A. Summary of the Invention

The present application discloses a method for efficiently separating small live insects from agricultural commodities, especially green coffee beans. The method generally requires that the particular commodity be placed on a screen having a small insect separating portion provided with a multiplicity of apertures sized smaller than the commodity but larger than the small insects. The screen is then vibrated at a frequency, normally at least about 60 cycles per second, to separate the small live insects from the commodity. The method of the present invention typically separates substantially all of the insects from the commodity. The separated insects can then be disposed of by suitable means known to the art.

The use of laterally reciprocated screens to separate insects from agricultural commodities other than green coffee beans is known. See U.S. Pat. No. 3,385,431 to Poetcher, issued May 28, 1968, which discloses separation of insects from grain, and U.S. Pat. No. 409,180 to Ferguson et al, issued Aug. 20, 1889, which discloses the separation of weevils and weevil dust from grain. The use of a slowly reciprocating screen to clean coffee beans is also known. See U.S. Pat. No. 545,184 to Yost, issued Aug. 27, 1895 which discloses that the screen should be moved as easily and as gently as possible. However, the foregoing patents do not appear to disclose or suggest the importance of using sufficiently high frequency vibrations (usually at least about 60 cycles per second) to separate the small live insects from green coffee beans, as does the method of the present invention.

While not wishing to be bound by any theory, it is believed that the method of the present invention takes advantage of the normal defensive reaction of small live insects to appear moribund ("play dead") when confronted by a violent (to them) disturbance. When in this state, the small insects become inactive, curl up and fall from the beans. Therefore, by selecting the proper frequency, a very effective and relatively inexpensive method is provided for separating small live insects from the agricultural commodity.

B. Agricultural Commodities

The method of the present invention can be used with agricultural commodities having a size similar to that of green coffee beans (typically 7 mm. in width by 10 mm. in length on the average), including soybeans and peanuts. Each of these agricultural commodities have similar insect contamination problems. In a particularly preferred embodiment, the method of the present invention is directed to solving the insect contamination problem inherent in green coffee beans.

The method of the present invention is directed at separating small live insects from the commodity, i.e. insects smaller than the commodity. These small insects are frequently no larger than the size of a sharpened pencil point and are typically on the order of about 1 to 3 mm. in size. These insects are of regulatory concern and include grain storage beetles, coffee beetles, cigarette beetles, coffee berry borers, coffee bean weevils, and flour beetles.

C. Screens

The screen used in separating the live insects from the agricultural commodity can be made from a variety of materials and in a variety of forms. A basic requirement of the screen is that it have an insect separating section for removing the small insects which is provided with a multiplicity of apertures sized smaller than the particular agricultural commodity but larger than the small insects. The apertures can have a square shape, rectangular shape, oval shape or circular shape or any other suitable shape sized smaller than the commodity but larger than the small insects. Generally, the apertures should create as much open area in the insect separating section as possible to insure adequate separation of the small insects from the commodity. For example, an open area of at least about 64% based on the total surface area of the screen (e.g. an 8 Tyler mesh screen) has been sufficient for the method of the present invention. Other than these considerations as to the size of apertures and the amount of open area in the insect separating portion, the size of the screen can vary depending on the amount of the commodity to be processed, the vibrational force to be imparted to the screen, etc.

The screen can be substantially horizontal or inclined at a suitable angle depending upon the particular apparatus involved. A particularly preferred screen has two sections forming the insect separating section and a third section having a plurality of apertures sized larger than the commodity. The first section on which the commodity is initially placed is slanted at an angle of from about 25° to 45° from the horizontal so as to spread out the commodity. The second section of the screen is slanted at an angle of from about 15° to 30° from the horizontal but less than the angle of slant of the first section so as to slow the movement of the commodity to prevent excessive bouncing movement thereof. The third section of the screen, which separates out items larger than the commodity, such as large insects, rocks and wood chips, is slanted at an angle of from about 10° to 25° from the horizontal but less than the angle of slant of the second section.

It has been found that an extremely short residence time on the insect separating portion is needed to separate the insects. For example, an average residence time of at least about 3 seconds has been found sufficient to adequately separate these small insects. If the small insect separating portion contains slanted sections, the angles of slant should be such that the commodity remains thereon for a sufficient period of time to insure adequate separation of the insects. Because of the short residence time necessary to adequately separate small insects, the method of the present invention is suitable for processing large amounts of agricultural commodities. For example, a preferred 3-section screen having a width of about 3.5 ft. and a length of about 6.7 ft. with a gridwork defining a multiplicity of square or rectangular-shaped apertures (64% open area) is adequate to process 60,000 lbs. of green coffee beans per hour (9,000 lbs. per linear ft./hr. or 2250 lbs. per sq. ft./hr.) and can potentially process up to 80,000 lbs. of green coffee beans per hour (12,000 lbs. per linear ft./hr. or 3,000 lbs. per sq. ft./hr.).

D. Vibratory Motion

Various types of vibratory motion can be imparted to the screen to inactivate and separate the insects from the agricultural commodity. The types of motion include reciprocating, oscillatory, circular, elliptical, undulating and the like. The vibrational motion can occur in a vertical plane, a horizontal plane, or combinations of vertical and horizontal planes. A particularly preferred vibrational motion is vertical orbital or rocking motion, e.g. circular motion or elliptical motion, usually combinations thereof, in one vertical plane.

The effectiveness of the vibrations imparted to the screen in separating the small live insects from the agricultural commodity depends on two inter-related factors: frequency and amplitude. By far the most important factor is the frequency. As used herein, the term "frequency" is defined as the rate at which the particular type of vibrational occurs. Generally, a high frequency vibrational motion, e.g. usually at least about 60 cycles per second, is necessary to separate substantially all of the small live insects. For example, it has been found that a frequency as low as 32 cycles per second separates only 90% of the small insects.

As used herein, the term "amplitude" is defined as the maximum distance the screen moves in any given direction away from a fixed relative start point during each cycle of the vibratory motion. Thus, the amplitude can have a one, two or three dimensional quality depending on the particular type of vibratory motion involved. Generally, an amplitude of from about 1/64 to ⅛ inches imparts effective vibrational motion to the screen.

The particular frequency and amplitude is generally selected so as not to impart excessive bouncing movement to the agricultural commodity. As used herein, "excessive bouncing movement" means that the commodity receives enough energy to become airborne. When the commodity becomes airborne, the small insects also become airborne. Because the airborne insects generally fall back on the commodity, the separation of the small insects from the commodity is not as complete as desired.

Typically, the method of the present invention removes substantially all of the small live insects from the agricultural commodity. By "substantially all", it is meant that only none to a few small live insects remain on the commodity.

The efficiency of a given vibrational frequency and amplitude can be easily tested prior to commercial use as follows. First, a test quantity of agricultural commodity is artificially contaminated with a a known number of insects. The insect contaminated test commodity is then placed on the screen. The screen is then vibrated at a given frequency and amplitude. The number of insects that are separated by vibrating the screen is then determined. The efficiency of the given frequency and amplitude is then calculated by dividing the number of insects separated by vibrating the screen by the total number of insects added to the commodity.

E. Operation of the Method of the Present Invention

In operation, the particular agricultural commodity is placed on the insect separating portion of the screen. The screen is vibrated at a suitable frequency and amplitude to separate the small live insects from the commodity. The commodity spreads out on the insect separating portion typically to a depth of about 1 inch. The small insects fall through the apertures in the insect separating portion and are collected for suitable disposal. In the case of the preferred three-section screen, the third section of the screen serves to separate the commodity from the larger insects, wood chips and rocks.

DETAILED DESCRIPTION OF A PREFERRED EMBODIMENT OF THE INVENTION

The following description is intended to illustrate the method of the present invention and is not limiting thereof.

Figure 1:
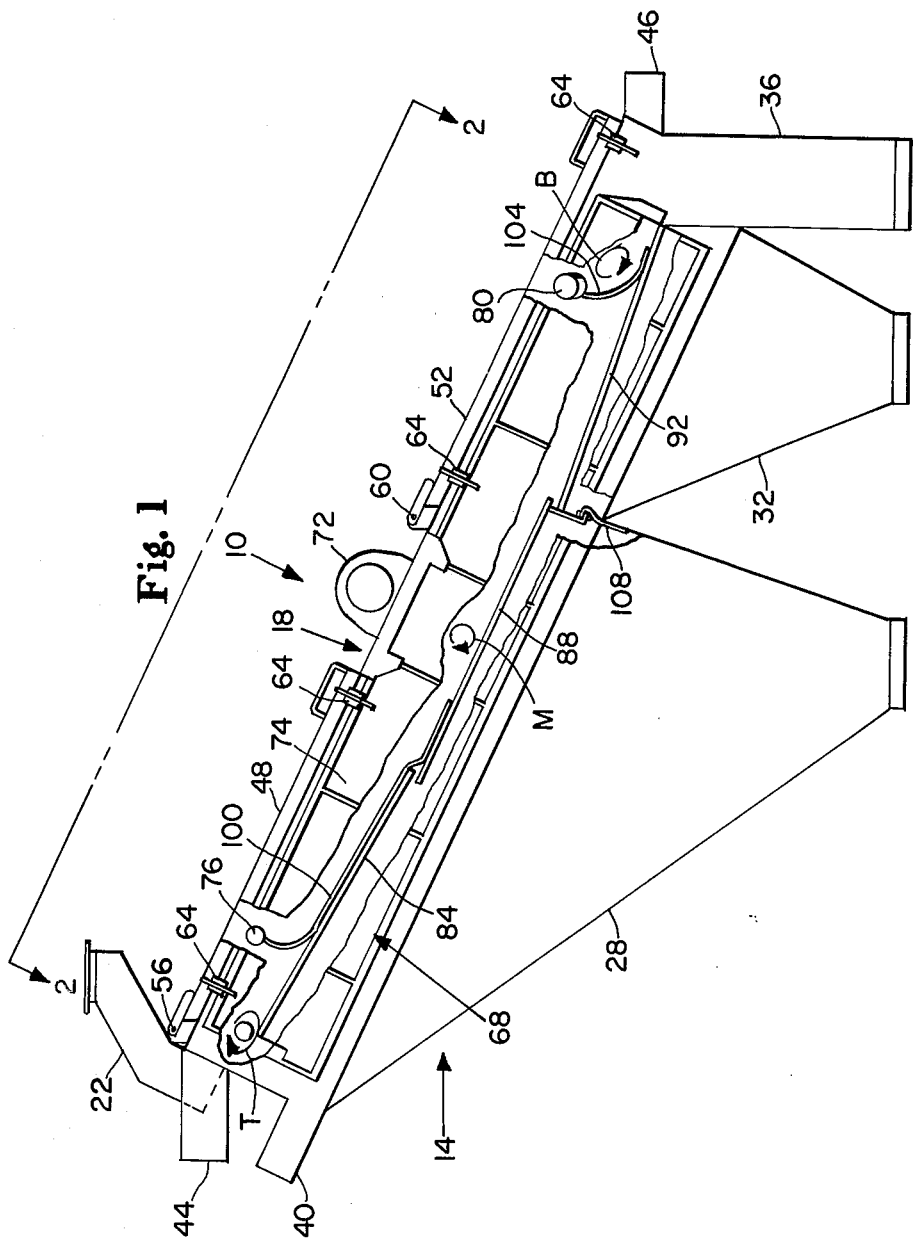
FIG. 1 is a side elevational view with parts broken away of a preferred system for removing small insects from green coffee beans.

Referring to FIG. 1, 10 generally indicates a system for removing the small insects from inherently contaminated green coffee beans. A particularly preferred system 10 is manufactured by Derrick Manufacturing Company of Buffalo, N. Y. under Model number K48-120A-3SM, which can be used to size classify particulate food and beverage materials such as instant coffee, chopped alfalfa, corn (feed, grits, meal or starch), grain or soybean meal.

System 10 generally includes an outer housing 14 and a screening machine 18. Housing 14 includes a commodity entrance chute 22 and a screening machine receiving section 24 within which sits screening machine 18. Housing 14 also includes a small insect hopper 28, a commodity hopper 32 and a large refuse hopper 36. Housing 14 is further provided with an air outlet 40, and support members 44 and 46 which serve to support housing 14 within the structure where system 10 is located. Housing 14 further includes dust covers 48 and 52 which are pivotally attached to receiving section 24 by hinges 56 and 60, respectively. Covers 48 and 52 can be secured in a closed position by a plurality of bolts indicated by 64.

Figure 2:
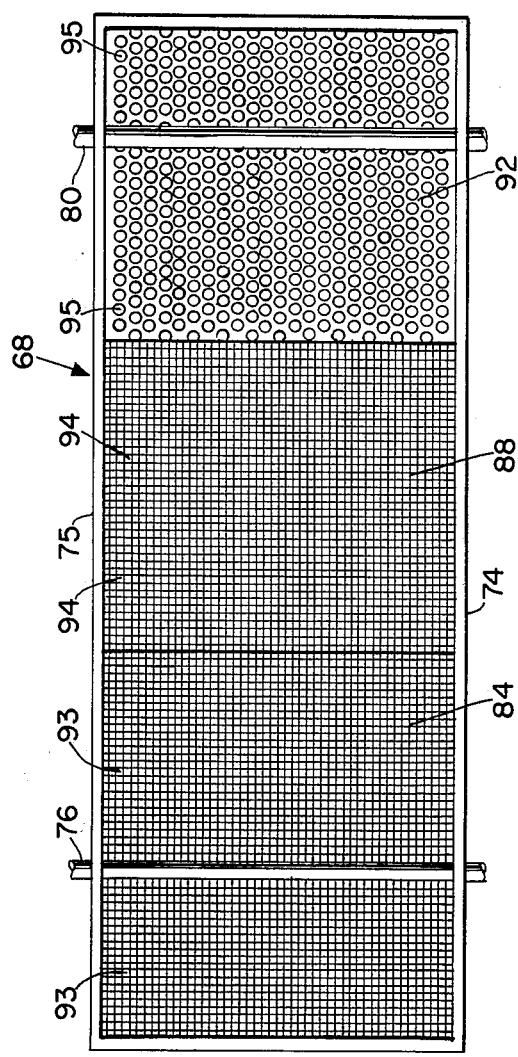
FIG. 2 is a view taken generally along line 2—2 of FIG. 1 with certain elements removed to better illustrate the screen.

Screening machine 18, which is slanted at an angle of approximately 25° from the horizontal, includes a generally U-shaped screen frame 68 and a vibrating motor assembly 72 which is mounted on the top and at the middle of sidewalls 74 and 75 of screen frame 68. See U.S. Pat. No. 3,970,549 to Ennis et al (partial assignment to Derrick Manufacturing Corp.) issued July 20, 1976, for a generally similar screening machine which employs a different screen assembly. Floating mounts, which are indicated by 76 and 80, and are secured to sidewalls 74 and 75, serve to support screen frame 68 within receiving section 24 such that screen frame 68 can move relatively freely during vibratory motion. The screening machine 18 further includes a screen formed by sections 84, 88 and 92. Each of sections 84, 88 and 92 are generally square shaped and are about 42×42 inches in dimension. Sections 84 and 88 serve as the portion for separating the small insects from the beans. As shown in FIG. 2, sections 84 and 88 are each formed of an interconnected gridwork which defines a multiplicity of generally rectangular or square-shaped apertures 93 and 94 sized smaller than the beans but larger than the small insects. A preferred gridwork for sections 84 and 88 when refuse larger than the beans is to be separated out is known as a Ty-Rod. See *Tyler-Specification Tables for Industrial Wire Cloth and Woven Wire Screens* (Catalog No. 74, 1978 ed.) at the bottom of page 64 for illustrations of representative Ty-Rods. A Ty-Rod gridwork generally defines (across the screen) several square-shaped apertures which border elongated rectangular apertures. In operation, the beans move generally perpendicular to the long axis of the rectangular apertures.

As also shown in FIG. 2, section 92 has a plurality of either circular or oval-shaped apertures 95 sized larger than the beans. Sections 84, 88 and 92 are rigidly secured to the side walls 74 and 75 of screen frame 68 by a plurality of bolts (not shown). Section 84 is slanted approximately 30° from the horizontal, while sections 88 and 92 are slanted approximately 25° and 20° from the horizontal, respectively. It should be noted that sections 84, 88 and 92 are not physically interconnected except by the sidewalls 74 and 75 of screen frame 68. However, as shown in FIG. 1, the back edge of section 84 does overlie the front edge of section 88, while the back edge of section 88 overlies the front edge of section 92.

As shown in FIG. 1, a resilient or flexible mat 100 formed of suitable material such as neoprene hangs at one end from floating mount 76 so as to extend over most of the length of section 84 and slightly onto section 88. Mat 100 also extends approximately the width of sections 84 and 88. A second resilient or flexible mat 104 hangs from floating mount 80 and drapes slightly onto section 92. A resilient or flexible separator 108 hangs from screen frame 68 so as to separate hopper 28 from hopper 32.

In operation, the inherently insect-contaminated green coffee beans are loaded into chute 22. Chute 22 dumps the beans onto section 84. Vibrating motor assembly 72, which is vibrated typically at a frequency of 60 cycles per second, and an amplitude of 1/32 of an inch, serves to spread the beans out onto section 84 to a depth of about 1 inch by virtue of the elliptical motion imparted thereto, as indicated by arrow T. Mat 100 serves the function of preventing the beans from excessively bouncing on section 84. As the beans reach the edge of section 84, they drop onto section 88 which retards the forward motion of the beans due to the lesser angle of slant. As the beans reach the midpoint of section 88, the motion imparted thereto changes to an approximately circular type motion, as indicated by arrow M. As the beans move over the surfaces of sections 84 and 88, the small insects are inactivated and fall through the apertures 93 and 94 into hopper 28. The insects are collected at the bottom of hopper 28 and then disposed of as desired. A vacuum is drawn on air outlet 40 so as to remove dust and other fine particles from hopper 28, as well as from the forward end of housing 14 and screening machine 18.

As the beans reach the back edge of section 88, they fall onto section 92. Movement of the beans along section 92 is further retarded by the lesser angle of slant, as well as mat 104. Also, the vibratory motion imparted to section 92 is such as to further retard the motion of the beans as indicated by arrow B. Because section 92 has apertures 95 sized larger than the beans, the beans fall into hopper 32 and are collected at the bottom thereof for further processing. Whatever large refuse, such as wood chips, rocks and large insects, which remains eventually goes over the back edge of section 92 and into hopper 36. This large refuse is collected at the bottom of hopper 36 and disposed of as desired.

What is claimed is:

1. A method for separating substantially all small live insects from an agricultural commodity having a size similar to that of green coffee beans, said method comprising the steps of:
   (a) placing the commodity on a screen having an insect separating portion provided with a multiplicity of apertures sized smaller than the commodity but larger than the small insects; and
   (b) vibrating the screen at a frequency of at least about 60 cycles per second, and an amplitude of from about 1/64 to ⅛ inches to separate the small insects, the frequency and amplitude being selected to avoid excessive bouncing of said commodity.

2. A method according to claim 1 wherein the commodity resides on the small insect separating portion for an average of at least about 3 seconds.

3. A method according to claim 2 wherein the commodity is green coffee beans.

4. A method according to claim 3 wherein said vibrating step comprises imparting vertical orbital motion to the screen.

5. A method according to claim 4 wherein the beans move along the screen at a rate of at least about 9000 linear ft. per hour during said vibrating step.

6. A method according to claim 5 wherein the insect separating portion has first and second sections and wherein the screen has a third section provided with a plurality of apertures sized larger than the commodity, the first section being slanted at an angle of from about 25° to 45° from the horizontal, the second section being slanted at an angle from about 15° to 30° from the horizontal and less than the angle of slant of the first section, the third section being slanted at an angle of from about 10° to 25° from the horizontal and less than the angle of slant of the second section.

7. A method for separating small live insects from green coffee beans, comprising the steps of:
(a) placing the beans on a screen having an insect separating portion provided with a multiplicity of apertures sized smaller than the beans but larger than the small insects; and
(b) vibrating the screen at an amplitude of from about 1/64 to ⅛ inches, and a frequency of at least 60 cycles per second sufficient to separate substantially all of the small insects.

8. A method according to claim 7 wherein said vibrating step comprises imparting vertical orbital motion to the screen.

9. A method according to claim 4 wherein the beans reside on the small insect separating portion for an average of at least about 3 seconds.

10. A method according to claim 9 wherein the insect separating portion has first and second sections and wherein the screen has a third section provided with a plurality of apertures sized larger than the beans, the first section being slanted at an angle of from about 25° to 45° from the horizontal, the second section being slanted at an angle from about 15° to 30° from the horizontal and less than the angle of slant of the first section, the third section being slanted at an angle of from about 10° to 25° from the horizontal and less than the angle of slant of the second section.

* * * * *